(12) United States Patent
Morita et al.

(10) Patent No.: US 11,822,338 B2
(45) Date of Patent: Nov. 21, 2023

(54) AUTOMATIC DRIVE VEHICLE

(71) Applicant: TOYOTA JIDOSHA KABUSHIKI KAISHA, Toyota (JP)

(72) Inventors: Makoto Morita, Mishima (JP); Koji Taguchi, Sagamihara (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 671 days.

(21) Appl. No.: 16/112,903

(22) Filed: Aug. 27, 2018

(65) Prior Publication Data

US 2019/0129438 A1 May 2, 2019

(51) Int. Cl.
| | | |
|---|---|---|
| G05D 1/02 | (2020.01) | |
| G05D 1/00 | (2006.01) | |
| H04W 4/44 | (2018.01) | |
| H04W 4/024 | (2018.01) | |
| G06V 20/56 | (2022.01) | |

(Continued)

(52) U.S. Cl.
CPC ....... *G05D 1/0223* (2013.01); *G01C 21/3811* (2020.08); *G01C 21/3837* (2020.08); *G05D 1/0088* (2013.01); *G05D 1/0246* (2013.01); *G06V 20/56* (2022.01); *H04W 4/024* (2018.02); *H04W 4/44* (2018.02); *G06F 3/0481* (2013.01); *G06F 3/04842* (2013.01); *G06T 11/60* (2013.01); *H04L 67/12* (2013.01); *H04W 4/80* (2018.02)

(58) Field of Classification Search
CPC .. G05D 1/0223; G05D 1/0246; G05D 1/0088; H04W 4/024; G06K 9/00791; G06F 3/0481; G06F 3/04842; G06T 11/60; G08G 1/202; G01C 21/3623; G06Q 10/08
See application file for complete search history.

(56) References Cited

U.S. PATENT DOCUMENTS

2012/0236287 A1* 9/2012 Lee ................. G06T 5/006
356/4.01
2016/0288788 A1* 10/2016 Nagasaka ............ G05D 1/0223
(Continued)

FOREIGN PATENT DOCUMENTS

| CN | 106128091 A | 11/2016 |
|---|---|---|
| CN | 106843219 A | 6/2017 |

(Continued)

OTHER PUBLICATIONS

JP2002296062A—translation attached (Year: 2002).*
(Continued)

*Primary Examiner* — Abby Y Lin
*Assistant Examiner* — Renee LaRose
(74) *Attorney, Agent, or Firm* — Sughrue Mion, PLLC

(57) ABSTRACT

The transportation vehicle determines whether the calculated distance is equal to or less than the predetermined distance (step S14). If the determination result of step S14 is positive, the transportation vehicle searches for the closest stoppable location to the current location (step S15). The transportation vehicle also performs the pause task at the closest stoppable location. The transportation vehicle performs visualization processing of the surrounding circumstances of the drop-off location, and displays the processed image on touch-screen. The user specifies the detailed drop-off location while looking at the touch-screen (step S16).

10 Claims, 7 Drawing Sheets

(51) Int. Cl.
  G01C 21/00     (2006.01)
  *H04W 4/80*         (2018.01)
  *G06F 3/0481*       (2022.01)
  *G06F 3/04842*      (2022.01)
  *G06T 11/60*        (2006.01)
  *H04L 67/12*        (2022.01)

(56) References Cited

U.S. PATENT DOCUMENTS

2017/0123423 A1*  5/2017  Sako ................. G08G 1/00
2017/0192432 A1*  7/2017  Arden ............. G01C 21/3438
2017/0344010 A1* 11/2017  Rander ........... G01C 21/3438
2018/0188731 A1*  7/2018  Matthiesen ...... G01C 21/3664
2018/0308191 A1* 10/2018  Matthiesen ...... G01C 21/3438
2018/0374002 A1* 12/2018  Li .................... G06Q 10/02

FOREIGN PATENT DOCUMENTS

JP      2002296062 A  * 10/2002
JP      2017-059254 A     3/2017
JP      2017-106741 A     6/2017
WO      2017/168754 A1   10/2017

OTHER PUBLICATIONS

JP2002296062A—figures translation attached (Year: 2002).*
JP2002296062A—abstract translation attached (Year: 2002).*
Huang Changzhi, "Automobile Decoration and Beauty", Jul. 2017, Beijing University of Aeronautics and Astronautics Press, pp. 108 to 109 (5 pages total).

* cited by examiner

AUTOMATIC DRIVE VEHICLE

CROSS-REFERENCE TO RELATED APPLICATION

The present disclosure claims priority under 35 U.S.C. § 119 to Japanese Patent Applications No. 2017-208044, filed on Oct. 27, 2017. The contents of these applications are incorporated herein by reference in their entirety.

TECHNICAL FIELD

The present disclosure relates to an automatic drive vehicle.

BACKGROUND

JP 2017-59254 A discloses an automatic drive vehicle capable of autonomous travel. The automatic drive vehicle is configured to generate information on automatic driving operation to a destination designated by a user based on various information acquired from radars, a camera group, a sensor group and GPS satellites. The automatic drive vehicle is also configured to control a motor drive portion and a steering drive portion based on the information on automatic driving operation.

The information on automatic driving operation includes a destination. The destination is often a drop-off location at which a rider (a user) vaguely desires in his/her pickup stage. In case of a transportation service with a vehicle on which a driver is riding (for example, a taxi, a limousine), the user is able to communicate about a detailed drop-off location with the driver while viewing surrounding circumstances nearby the destination. For example, when the destination is a commercial facility having several entrances, the user is able to inform the driver of his/her wishes to move to a desirable entrance at a stage where these entrances are nearly visible. However, it is hard for the user to adjust the detailed drop-off location in a case of using the automatic drive vehicle on which no driver is riding.

The present disclosure addresses the above described problem, and an object of the present disclosure is, in the transportation service with the automatic drive vehicle on which no driver rides, to provide measures to adjust the detailed drop-off location nearby the destination.

SUMMARY

A first aspect of the present disclosure is an automatic drive vehicle for solving the problem described above and has the following features.

The automatic drive vehicle is configured to travel autonomously from a pickup location to a drop-off location in accordance with a transportation request from a user.

The automatic drive vehicle comprises an autonomous travel control portion, a recognition portion, a visualization processing portion and a user interface portion.

The autonomous travel control portion is configured to control an autonomous travel of the automatic drive vehicle.

The recognition portion is configured to recognize surrounding circumstances of the automatic drive vehicle.

The visualization processing portion is configured to execute processing to visualize the surrounding circumstances and generate a processed image of the surrounding circumstances.

The user interface portion is configured to provide the processed image to the user.

The processed image is a surrounding image of the drop-off location.

The autonomous travel control portion is further configured to:
control the automatic drive vehicle so as to travel autonomously along a route from the pickup location to the drop-off location; and
after the provision of the surrounding image by the user interface portion, when a detailed drop-off location is specified through the user interface portion, control the automatic drive vehicle so as to travel autonomously along a route from its present location to the detailed drop-off location.

A second aspect of the present disclosure has the following features according to the first aspect.

The autonomous travel control portion is further configured to perform a deceleration processing.

The deceleration processing is processing to set a target speed of the automatic drive vehicle being equal to or less than a predetermined speed during the provision of the surrounding image by the user interface portion.

A third aspect of the present disclosure has the following features according to the second aspect.

The autonomous travel control portion is further configured to perform a pause task.

The pause task is a task to stop the automatic drive vehicle temporarily at a stoppable location closest to the present location during the provision of the surrounding image by the user interface portion.

A fourth aspect of the present disclosure has the following features according to the third aspect.

The automatic drive vehicle further comprises a database in which historical data of the stoppable location at which the pause task was carried out.

The visualization processing portion is further configured to:
specify, based on the historical data, a stoppable location which is close to the drop-off location and also is highest usage frequency as a most frequent stop location; and
perform the pause task when a distance of the route from the present location to the drop-off location is equal to or less than a distance of a from the most frequent stop location to the drop-off location.

A fifth aspect of the present disclosure has the following features according to the first aspect.

The visualization processing portion is further configured to execute superposition processing.

The superposition processing is processing to superimpose availability information of a drop-off task on the processed image.

A sixth aspect of the present disclosure is an automatic drive vehicle for solving the problem described above and has the following features.

The automatic drive vehicle is configured to travel autonomously along a route from a pickup location to a drop-off location in accordance with a transportation request from a mobile terminal of a user.

The automatic drive vehicle comprises an autonomous travel control portion, a recognition portion, a visualization processing portion and a communication portion.

The autonomous travel control portion is configured to control an autonomous travel of the automatic drive vehicle.

The recognition portion is configured to recognize surrounding circumstances of the automatic drive vehicle.

The visualization processing portion is configured to execute processing to visualize the surrounding circumstances and generate a processed image of the surrounding circumstances.

The communication portion is configured to perform near-field communication with the mobile terminal.

The processed image is a surrounding image of the drop-off location.

The autonomous travel control portion is further configured to:
control the automatic drive vehicle so as to travel autonomously along a route from the pickup location to the drop-off location; and
after the provision of the surrounding image to the mobile terminal via the communication portion, when a detailed drop-off location is received from the mobile terminal via the communication portion, control the automatic drive vehicle so as to travel autonomously along a route from its present location to the detailed drop-off location.

A seventh aspect of the present disclosure has the following features according to the sixth aspect.

The autonomous travel control portion is further configured to perform a deceleration processing.

The deceleration processing is processing to set a target speed of the automatic drive vehicle being equal to or less than a predetermined speed during the provision of the surrounding image to the mobile terminal.

An eighth aspect of the present disclosure has the following features according to the second aspect.

The autonomous travel control portion is further configured to perform a pause task.

The pause task is a task to stop the automatic drive vehicle temporarily at a stoppable location closest to the present location during the provision of the surrounding image to the mobile terminal.

A ninth aspect of the present disclosure has the following features according to the eighth aspect.

The automatic drive vehicle further comprises a database in which historical data of the stoppable location at which the pause task was carried out.

The visualization processing portion is further configured to:
specify, based on the historical data, a stoppable location which is close to the drop-off location and also is highest usage frequency as a most frequent stop location; and
perform the pause task when a distance of the route from the present location to the drop-off location is equal to or less than a distance of a from the most frequent stop location to the drop-off location.

A tenth aspect of the present disclosure has the following features according to the sixth aspect.

The visualization processing portion is further configured to execute superposition processing.

The superposition processing is processing to superimpose availability information of a drop-off task on the processed image.

According to the first or the sixth aspect, the surrounding image of the drop-off location is provided to the user. Therefore, it is possible for the user who saw this surrounding image to specify the detailed drop-off location in consideration of actual situation around the drop-off location. Then, when the detailed drop-off location is specified by the user, an autonomous travel to the detailed drop-off location is carried out. Therefore, it is possible to perform the drop-off task at the drop-off location where the user truly desires.

According to the second or seventh aspect, the deceleration processing is carried out, during the provision of the surrounding image, in which the target speed of the automatic drive vehicle is set to be equal to or less than the predetermined speed. Therefore, it is possible for the user to specify the detailed drop-off location with sufficient margin.

According to the third or eighth aspect, the pause task is carried out at the stoppable location closest to the present location during the provision of the surrounding image. Therefore, it is possible for the user to safely specify the detailed drop-off location.

According to the fourth or ninth aspect, the most frequent stop location is specified based on the historical data of the stoppable location. In addition, the pause task is carried out when the distance of the route from the present location to the drop-off location is equal to or less than the distance of the route from the most frequent stop location to the drop-off location. Herein, the most frequent stop location is the stoppable location which is close to the drop-off location and is highest usage frequency. Therefore, when the pause task is carried out based on the distance condition described above, the most frequent stop location would be selected with a high probability as the closest stoppable location. Therefore, it is possible to avoid from occurring a situation in which the pause task is not carried out during the provision of the surrounding image.

According to the fifth or tenth aspect, the superposition processing is executed to superimpose the availability information of the drop-off task by the automatic drive vehicle on the surrounding image. Therefore, it is possible for the user to specify the detailed drop-off location in consideration of the availability information.

DESCRIPTION OF EMBODIMENTS

Figure 1:
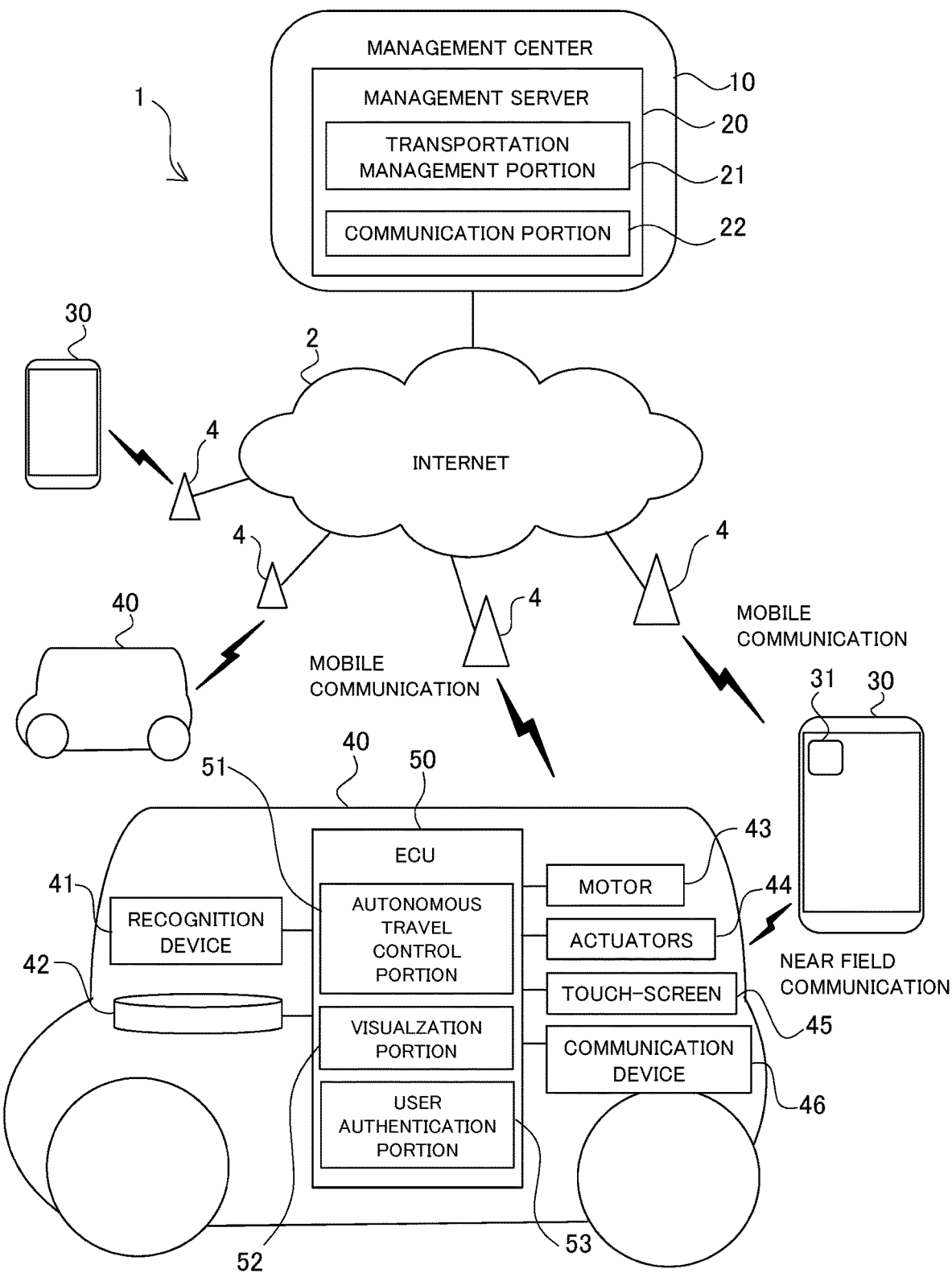
FIG. 1 is a diagram for explaining a configuration of a transportation system to realize a transportation service with an automatic drive vehicle according to each embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

1. Configuration of a Transportation System

An automatic drive vehicle according to the first embodiment is a vehicle constituting a transportation system and capable of autonomous traveling. FIG. 1 is a diagram for explaining a configuration of the transportation system for realizing the transportation system with the automatic drive vehicle according to first embodiment. Note that the configuration of the transportation system 1 shown in FIG. 1 is common not only to the first embodiment but also from second to fifth embodiments described later.

The transportation system 1 shown in FIG. 1 comprises automatic drive vehicles (hereinafter also simply referred to as a "vehicle" or "vehicles") 40, a mobile terminal 30 owned by a user and a management center 10 which communicates the vehicles 40 and the mobile terminal via a network (i.e. internet) 2. The number of the vehicles 40 constituting the transportation system 1 is at least two.

The management center 10 is a facility operated by a provider that provides the transportation service. However, it is unnecessary for the provider to be resident in the management center 10 and a management server 20. That is, it is sufficient at least a management server 20 is installed in the management center 10. The management server 20 itself may be the management center 10. The management server 20 is a computer having at least one processor and at least one memory. In the memory, at least one program for the transportation service and various data are stored. When the program stored in the memory is read out and executed by the processor, the management server 20 implements various functions represented by blocks in FIG. 1.

The management server 20 is provided with a large-capacity storage device such as HDD and SSD. Various databases are built in the storage device. Various databases include a database for storing information on users who use the transportation service, a database for storing map information and road traffic information on areas providing the transportation, and a database for storing status information of the vehicles 40. The status information of the vehicles 40 includes not only travel information (for example, running area, diagnosis) but also service engaging states (for example, service underway and service standby). The management server 20 may be composed of a plurality of computers.

The management server 20 is connected to the network 2. The management server 20 is configured to communicate with the vehicles 40 via the network 2. The management server 20 is also configured to communicate with a user's mobile terminal 30 via the network 2. In FIG. 1, the function for the transportation service of the management server 20 is represented by a plurality of blocks. The blocks correspond to a transportation management portion 21 and a communication portion 22.

The transportation management portion 21 is configured to execute reception processing to accept a transportation request and dispatch processing to make an arrangement of a transportation vehicle to a pickup location.

The reception processing is processing to accept the transportation request transmitted from the mobile terminal 30 of the user via the network 2. The transportation request accepted by the reception processing includes, for example, the following information on (i) to (v).
(i) user's personal identification information (i.e. user ID information)
(ii) pickup location at which the user wishes to ride
(iii) drop-off location at which the user wishes to drop off
(iv) number of prospective riders
(v) pickup time during which the user wishes to ride The information on (ii) pickup location may be present location of the mobile terminal 30 specified from GPS information of the mobile terminal 30. Also, (iii) drop-off location may not be included in the transportation request. In this case, the user may specify (iii) drop-off location from after sending the transportation request and before pickup, or the user may specify (iii) drop-off location after pickup.

The dispatch processing is processing to deliver the transportation vehicle to (ii) pickup location based on the transportation request and information stored in the database of the management server 20. In the dispatch processing, at first, a standby vehicle which is able to reach (ii) pickup location by (v) pickup time and also has the shortest autonomous travel time of route to (ii) pickup location is extracted. The autonomous travel time is calculated under an assumption that the standby vehicle normally travels along the route from its present location to (ii) pickup location.

Subsequently, in the dispatch processing, it is determined whether or not capacity of the extracted vehicle is equal to or less than (iv) number of prospective riders. When it is determined that the capacity is larger than (iv) number of prospective riders, the extracted vehicle is selected as the transportation vehicle. When it is determined that the capacity is equal to or less than (iv) number of prospective riders, the unoccupied vehicle which is able to reach (ii) pickup location by (v) pickup time and also has the second shortest autonomous travel time of route to (ii) pickup location is extracted. Then the determination on the capacity of the newly extracted vehicle is executed. By repeating the extraction of the unoccupied vehicle and the determination on the capacity of the extracted vehicle, the transportation vehicle is selected.

Subsequently, in the dispatch processing, transportation information which is transmitted to the transportation vehicle and the mobile terminal 30 is generated. Transportation information for the transportation vehicle includes an instruction for transportation. The instruction for transportation includes, for example, (i) user ID information and (ii) pickup location. Transportation information for the mobile terminal 30 includes, for example, ID information of the selected transportation vehicle and estimated times at which the same vehicle reaches (ii) pickup location and (iii) drop-off location, respectively. The estimated time to reach (ii) pickup location is calculated under an assumption that the transportation vehicle normally travels from its present location to (ii) pickup location. The estimated time to reach (iii) drop-off location is calculated under an assumption that the transportation vehicle normally travels from (ii) pickup location to (iii) drop-off location.

The communication portion 22 is configured to transmit the transportation information to the selected vehicle 40 and the mobile terminal 30 of the user via the network 2.

The mobile terminal 30 is a wireless communication terminal capable of wireless communication with the base stations 4 on the network 2, for example, a smartphone. The communication standard of the wireless communication used by the mobile terminal 30 may be a mobile communication standard such as 4G, LTE, 5G, or the like. In the mobile terminal 30, an application 31 for the transportation service is installed. When the user starts up the application 31, it is possible for the user to connect to transmit the transportation request to the management center 10.

The mobile terminal 30 preferably includes a chip (not shown) of Near Field Communication such as Wi-Fi, Bluetooth (registered trademark) or the like. Near Field Communication is used for authentication between the mobile terminal 30 and the vehicles 40. However, if different means are used for the authentication, the function of Near Field Communication is not required.

Each of the vehicles 40 is configured to travel autonomously along routes from its present location to (ii) pickup location and from (ii) pickup location to (iii) drop-off location based on the transportation information described above and various information. The various information for autonomous travel includes information obtained by recognition devices (i.e. a recognition portion) 41 and map information stored in the map database 42. The recognition devices 41 include sensors which is configured to obtain external information of the vehicle 40 such as a camera sensor, a millimeter wave sensor and a LIDER (laser imaging detection and ranging) and a GPS receiver which is configured to obtain GPS information of the vehicle 40.

The recognition device 41 and the database 42 are connected to an electronic control unit (hereinafter also referred to as an "ECU") 50. The ECU 50 has at least one processor and at least one memory. In the memory, at least one program for autonomous travel and various data are stored. When the program stored in the memory is read out and executed by the processor, the ECU 50 implements various functions represented by blocks in FIG. 1. The ECU 50 may be composed of a plurality of ECUs.

In FIG. 1, among the functions for the autonomous travel of the ECU 50, the functions related to the transportation service are represented by a plurality of blocks. The blocks correspond to an autonomous travel control portion 51, a visualization processing portion 52 and a user authentication portion 53. For example, the autonomous travel control portion 51 is configured to calculate a traveling route based on the transportation information, the GPS information of the vehicle 40, and the map information stored in the database 42. The autonomous travel control portion 51 is also configured to control a motor 43 and actuators (for example, a braking actuator and a steering actuator) 44 so that the vehicle 40 autonomously travels along the calculated traveling route. There are various known methods for the autonomous travel, and in the present disclosure there is no limitation on the method for the autonomous travel.

An autonomous travel task of the routes from the present location to (ii) pickup location from (ii) pickup location to (iii) drop-off location is carried out by the autonomous travel control portion 51. In addition, a pause task is carried out at a location before (iii) drop-off location by the autonomous travel control portion 51. Further, the autonomous travel task of a route from a location where the pause task was carried out (hereinafter also referred to as a "temporal stop location") to a detailed drop-off location is carried out by the autonomous travel control portion 51.

The visualization processing portion 52 is configured to perform recognition processing to recognize surrounding circumstances of (iii) drop-off location and generation processing to generate an image to be displayed on a touch-screen 45. The recognition processing is processing to analyze the surrounding circumstances of (iii) drop-off location obtained by the recognition device 42 and to recognize landmarks. The landmarks recognized in the recognition processing is moving objects such as a walker, a bicycle, a vehicle, and a fixed object such as a telephone pole, a street plant, a traffic light, and a guard rail. The generation processing is processing to generate a 2D or 3D image based on the recognized landmark information and the map information in the database 42. In the generation processing, an image is generated by combining the map information around (iii) drop-off location stored in the database 42 with the landmark information which is not included in the map information, that is, landmark information newly recognized in the recognition processing. The processed image generated by the visualization processing portion 52 is displayed on the touch-screen 45.

The touch-screen 45 is an interface (i.e. a user interface portion) comprising an output unit which is configured to provide the user with various information including the processed images generated by the visualization processing portion 52, and an input unit which is configured to receive an input from the user. The touch-screen 45 is detachably provided at, for example, a predetermined location of the vehicle 40 (for example, a back face of a passenger seat).

A communication device 46 is configured to connect to the network 2. Specifically, the communication device 46 is configured to connect to the network 2 via closest base station 4 by wireless communication between the communication device 46 and the closest base station 4. The communication standard of the wireless communication used by the communication device 46 may be a mobile communication standard such as 4G, LTE, 5G, or the like. On the network 2, a connection destination of the communication device 46 is the communication portion 22 of the management server 20. From the communication device 46 to the communication portion 22, for example, information on the surrounding circumstances obtained by the external sensors and the GPS information are transmitted. From the communication portion 22 to the communication portion 52, for example, the instruction for transportation is transmitted.

In addition to the function of the wireless communication described above, the communication device 46 also has a function of a Near Field Communication. The communication standard for the Near Field Communication function may be a standard capable of wireless communication at a short distance, such as Wi-Fi, Bluetooth (registered trademark) or the like. The user authentication unit 53 is configured to communicate wirelessly with the mobile terminal 30 by using the Near Field Communication function of the communication device 46. The user authentication unit 53 performs Near Field Communication with the mobile terminal 30 located in the vicinity of the vehicle 40 and directly acquires ID information (for example, PIN code) of the mobile terminal 30. Then, the user authentication unit 53 collates the ID information directly acquired from the mobile terminal 30 by Near Field Communication with (i) user ID information acquired from the management server 20. If the two information match, the user authentication portion 53 authenticates the user of the mobile terminal 30 as a source terminal of the transportation request. The user authentication performed by the user authentication portion 53 is used as, for example, conditions of the door lock release of the vehicle 40 at (ii) pickup location.

2. Example of a Basic Flow of the Transportation Service

Figure 2:
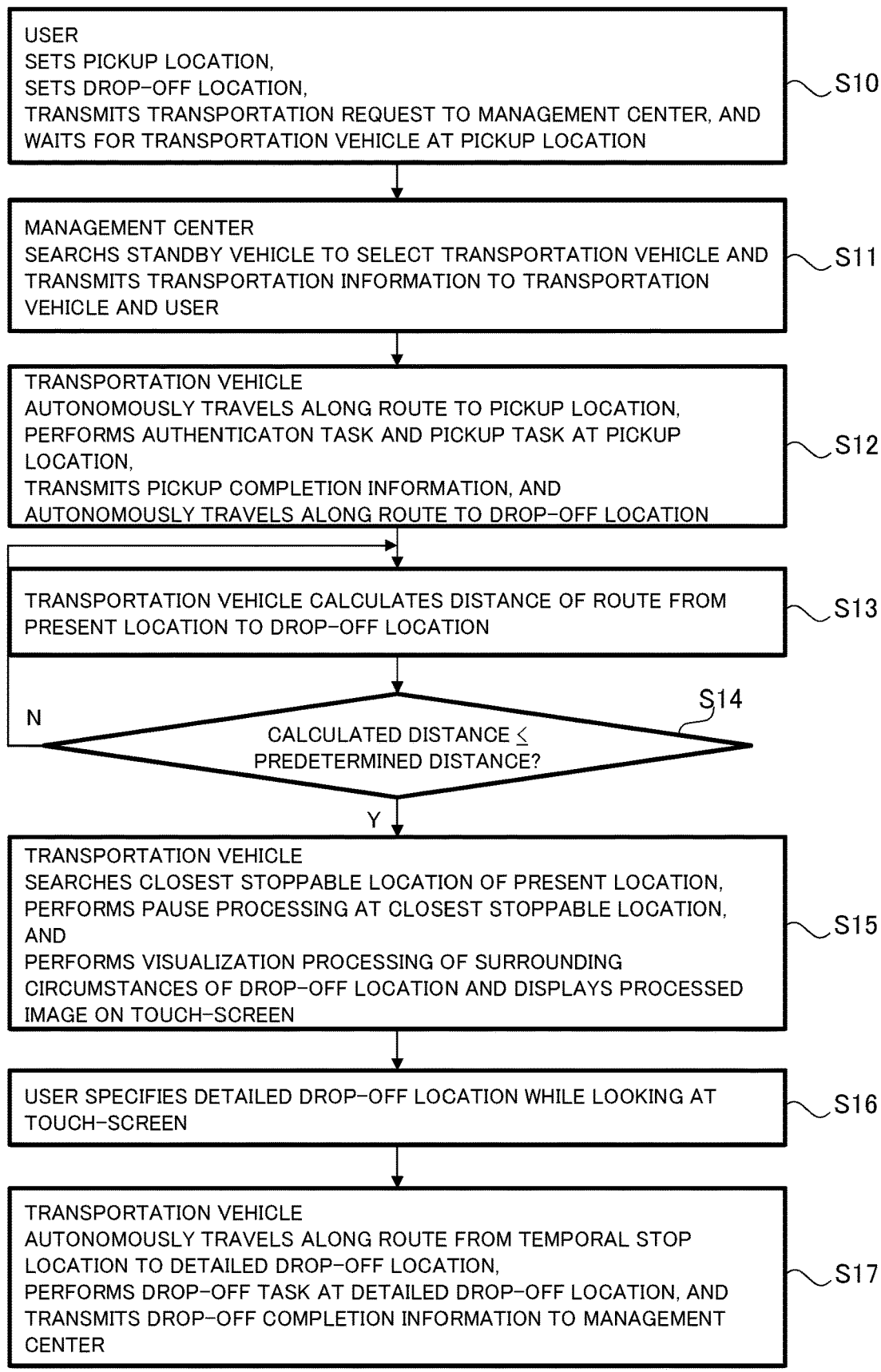
FIG. 2 is a flowchart for showing an example of a flow of the transportation service with the automatic drive vehicle according to a first embodiment of the present disclosure.
Figure 3:
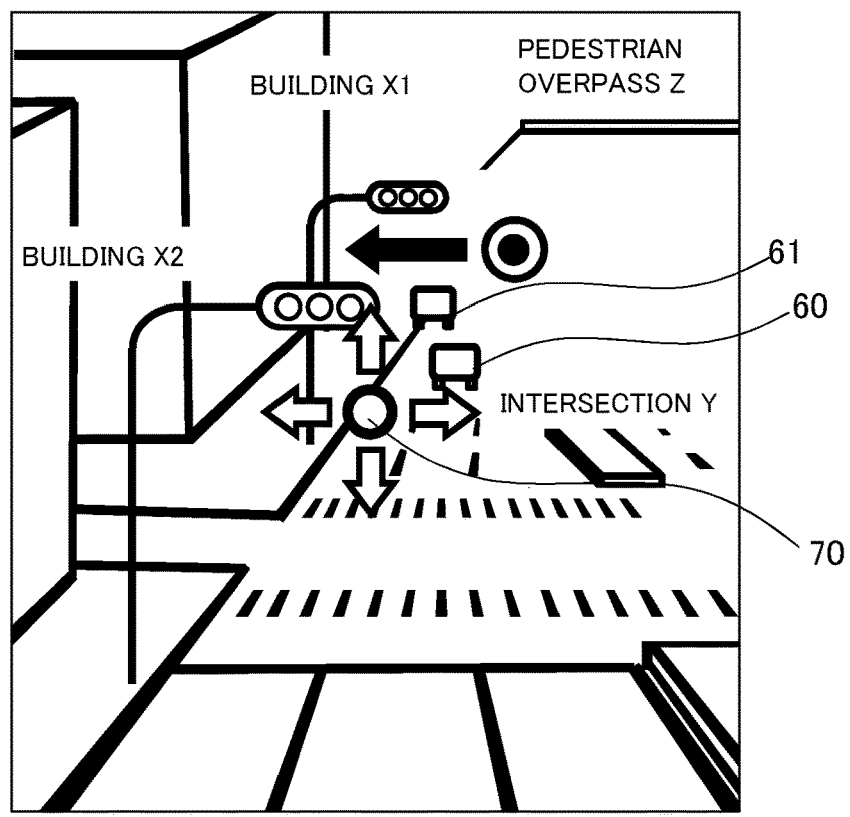
FIG. 3 is a diagram for showing an example of a 3D image around (iii) drop-off location that is included in a transportation request.

An example of a processing flow of the transportation service according to the first embodiment will be described with reference to FIGS. 2 and 3. FIG. 2 is a flowchart for showing an example of a flow of the transportation service with the automatic drive vehicle according to the first embodiment. FIG. 3 is a diagram for showing an example of a 3D image around (iii) drop-off location.

The processing flow of the transportation system shown in FIG. 2 is a flow after the user operates the mobile terminal 30 to start up the application 31. As shown in step S10 of FIG. 2, the user sets (ii) pickup location and (iii) drop-off location and transmits the transportation request to the management center 10. When the user sets (iv) number of prospective riders and/or (v) pickup time during which the user wishes to ride, the transportation request includes the information on (iv) and/or (v). After the transmission of the transportation request, the user waits for the transportation vehicle at the pickup location.

When the management center 10 receives the transportation request, the processing shown in step S11 is started. In the step S11 the management center 10 searches a vehicle which is in the service standby from the vehicles 40 to select the transportation vehicle. Further, the management center 10 transmits the transportation information to the selected vehicle and the user. The transportation information for the selected vehicle includes, for example, (i) user ID information and (ii) pickup location. Transportation information for the user includes, for example, ID information of the selected transportation vehicle and estimated times at which the same vehicle reaches (ii) pickup location and (iii) drop-off location, respectively.

When the transportation vehicle receives the transportation information, the processing of step S12 is started. In the step S12, the transportation vehicle autonomously travels along the route from the present location to the pickup location. The transportation vehicle performs authentication task with the user at the pickup location and performs a pickup task. Note that authentication task and the pickup task may be not carried out at the pickup location. That is, if there is a stoppable location near the pickup location, the authentication task and the pickup task may be carried out at this stoppable location. After completion of the pickup task, the transportation vehicle transmits pickup completion information to the management center 10, and then autonomously travels along the route to (iii) drop-off location.

(iii) After the start of the autonomous travel toward the drop-off location, the transportation vehicle calculates a distance of the route from the present location to (iii) drop-off location in step S13. When the distance of the route is calculated, the processing of step S14 is started. In the step S14, the transportation vehicle determines whether the calculated distance is equal to or less than a predetermined distance. Note that the predetermined distance is preset in consideration of normal performance of the recognition device 41 to recognize (iii) drop-off location. However, when it is expected from the map information, the road traffic information or the like in the database 42 that the surrounding circumstances of (iii) drop-off location are bad view, the predetermined distance may be changed to a shorter distance. Conversely, when the surrounding circumstances of the drop-off location is expected to be good view, the predetermined distance may be changed to a longer distance. If the determination result of the step S14 is negative, the transportation vehicle performs the processing of the step S13 again. That is, the processing of the steps S13 and S14 is repeated until a positive determination result is obtained in the processing of the step S14.

If the determination result of the step S14 is positive, the transportation vehicle performs the process of step S15. In the step S15, the transportation vehicle searches closest stoppable location to the present location. The transportation vehicle also performs the pause task at this closest stoppable location. Then, the transportation vehicle performs visualization processing of the surrounding circumstances of (iii) drop-off location obtained from the recognition device 41, and displays the processed image on the touch-screen 45. The visualization processing of the surrounding circumstances of (iii) drop-off location may be carried out in parallel with the search processing of the closest stoppable location, and the processed image may be displayed on the touch-screen 45 during or soon after the operation of the pause task.

When the surrounding image of (iii) drop-off location is displayed on the touch-screen 45, it is possible for the user to specify the detailed drop-off location. In step S16, the user specifies the detailed drop-off location while looking at the touch-screen 45.

FIG. 3 shows an example of a surrounding image of (iii) drop-off location displayed on the touch-screen 45. In FIG. 3, it is assumed that a "building X1" is a building located at (iii) drop-off location. On this processed image, in addition to the building X1, a "building X2" next to the building X1 is also displayed as the map information. Also, on this processed image, an "intersection Y" at which a traveling road of the transportation vehicle and a road between the building X1 and the building X2 intersects, and a "pedestrian overpass Z" located ahead of the building X1 are displayed as the map information. On this processed image, preceding vehicles 60 and 61 are displayed as landmark information.

Further, on this processed image, a pointer 70 for selecting the detailed drop-off location is superimposed and displayed. The user, for example, taps one of the arrows of the pointer 70 to move the pointer 70 for a preferred direction and taps a circle of the pointer 70 when the circle comes to a preferred position. In such a way, the user is able to specify the detailed drop-off location.

When the detailed drop-off location is specified by the user, processing of step S17 shown in FIG. 2 is started. In the step S17, the transportation vehicle autonomously travels along the route from the temporal stop location to the detailed drop-off location. The transportation vehicle performs a drop-off task at the detailed drop-off location. After completion of the drop-off task, the transportation vehicle transmits drop-off completion information to the management center 10.

3. Effects According to the Automatic Drive Vehicle According to the First Embodiment According to the first embodiment described above, the automatic drive vehicle temporarily stops at the location before (iii) drop-off location and displays on the touch-screen 45 the surrounding image of (iii) drop-off location. Therefore, it is possible for the user to specify the detailed location before (iii) drop-off location vehicle while looking at the processed image considering actual situation. In other words, it is possible for the user to specify the detailed location where he/she truly desires to get off the transportation vehicle near the destination.

Second Embodiment

1. Characteristic of the Automatic Drive Vehicle According to a Second Embodiment In the first embodiment described above, the surrounding image of (iii) drop-off location is displayed on the touch-screen 45 during the pause task which is carried out before (iii) drop-off location. In the second embodiment, the surrounding image of (iii) drop-off location is displayed on the touch-screen 45 during a decelerating travel which is carried out before (iii) drop-off location.

In the second embodiment, the autonomous travel control portion 51 is configured to perform a deceleration processing before (iii) drop-off location. The deceleration processing is processing in which a target value of the vehicle speed (hereinafter also referred to as a "target speed") is set to a predetermined speed when it is determined that a distance of the route from the present location to (iii) drop-off location is equal to or less than a predetermined distance. The predetermined speed is preset as a speed at which the user is able to operate the touch-screen 45 safety. The predetermined speed may be zero kilometers per hour. However, when a lower limit speed is set based on restrictions on the road traffic, the predetermined speed is set to this lower limit speed. When the vehicle speed has been already equal to or lower than the predetermined speed before the start of the deceleration processing, the predetermined speed is set as a upper limit of the target speed until the detailed drop-off location is specified by the user.

2. Example of a Flow of the Transportation Service

Figure 4:
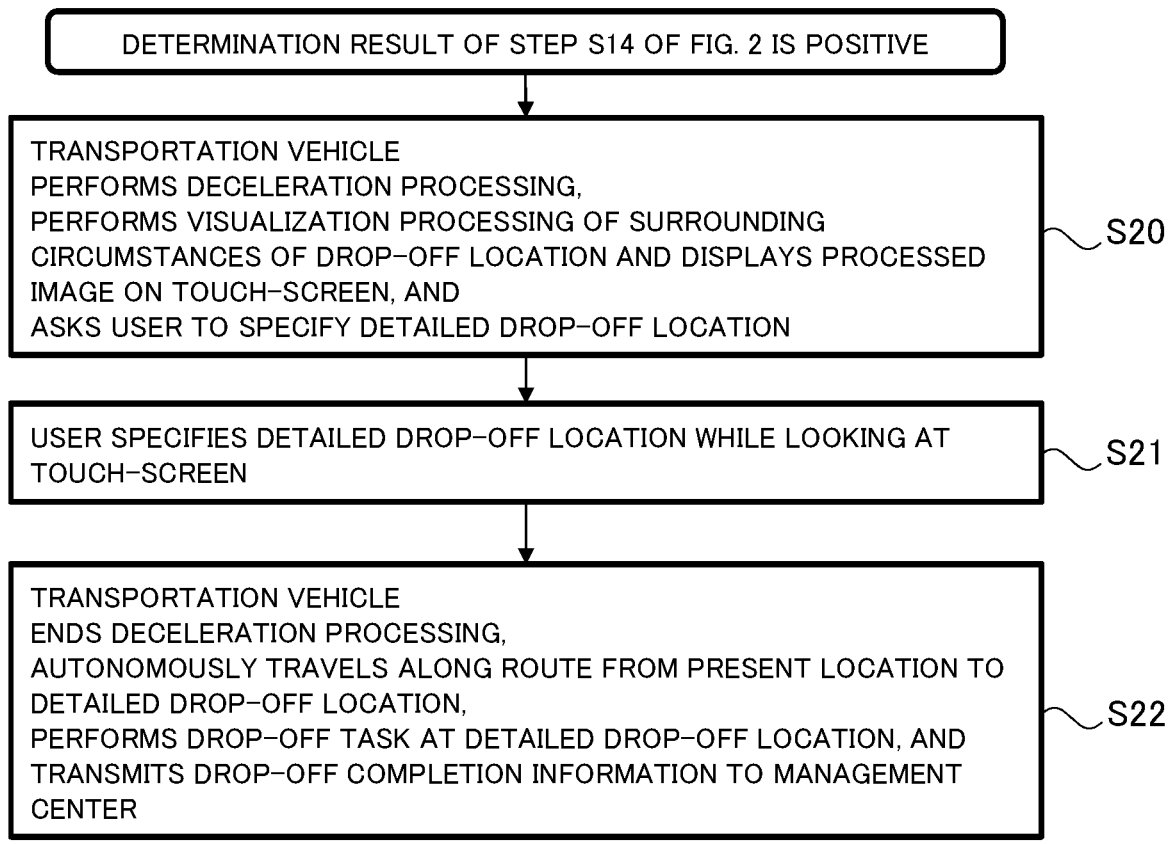
FIG. 4 is a flowchart for showing an example of a flow of the transportation service with the automatic drive vehicle according to a second embodiment of the present disclosure.

An example of a processing flow of the transportation service according to the second embodiment will be described with reference to FIG. 4. FIG. 4 is a flowchart for showing an example of a flow of the transportation service with the automatic drive vehicle according to the second embodiment.

The processing flow of the transportation system shown in FIG. 4 is a flow after the user operates the mobile terminal 30 to start up the application 31. In FIG. 4, processing in a case where the determination result of the step S14 shown in FIG. 2 is positive will be described. The processing before the step S14 (that is, the processing from steps S10 to S14) is the same as described in FIG. 2.

As shown in FIG. 4, when the determination result of step S14 is positive, the transportation vehicle performs processing shown in step S20. In the step S20, the transportation vehicle performs the deceleration processing to set the target speed to the predetermined speed. In addition, the transportation vehicle performs visualization processing of the surrounding circumstances of (iii) drop-off location obtained from the recognition device 41 and then displays the processed image on the touch-screen 45. In addition, the transportation vehicle asks the user to specify the detailed drop-off location. The method of the request may be a method of displaying contents in the request on the touch-screen 45 or a method of conveying contents in the request by sound.

When the processed image is displayed on the touch-screen 45, it is possible for the user to specify the detailed drop-off location. In step S21, the user specifies the detailed drop-off location while looking at the touch-screen 45.

When the detailed drop-off location is specified by the user, processing shown in step S22 is started. In the step S22, the transportation vehicle ends the deceleration processing and autonomously travels along the route from the present location to the detailed drop-off location. Also, the transportation vehicle performs the drop-off task at the detailed drop-off location. After completion of the drop-off task, the transportation vehicle transmits drop-off completion information to the management center 10.

In contrast to the first embodiment described above in which the pause task is carried out before (iii) drop-off location, the transportation vehicle according to the second embodiment approaches (iii) drop-off location gradually during the deceleration processing. Therefore, in the second embodiment, there is a possibility that the transportation vehicle reaches (iii) drop-off location before the user specifies the detailed drop-off location. In such a case, the drop-off task is carried out at (iii) drop-off location or at closest stoppable location to (iii) drop-off location. That is, if there is an updated designation is specified by the user, the drop-off task is carried out at the updated designation (i.e. the detailed drop-off location). Otherwise, the drop-off task is carried out at (iii) drop-off location.

3. Effects According to the Automatic Drive Vehicle According to the Second Embodiment According to the second embodiment described above, the automatic drive vehicle is decelerated before (iii) drop-off location and the surrounding image of (iii) drop-off location is displayed on the touch-screen 45. Therefore, it is possible to obtain similar effects as the automatic drive vehicle according to the first embodiment. Further, according the second embodiment, the transportation is able to travel slowly without pausing at the closest stoppable location of the present location before (iii) drop-off location, which is different from the first embodiment. Therefore, it is possible for the user to reach the detailed drop-off location earlier.

Third Embodiment

1. Characteristic of the Automatic Drive Vehicle According to a Third Embodiment In the first embodiment described above, the predetermined distance (a fixed threshold value) was used for the distance determination before (iii) drop-off location. In the third embodiment, a threshold value for the distance determination is set by using historical data of the temporal stop location in the database 42.

In the third embodiment, the communication device 46 is further configured to transmit, as a part of the travel information, information of the temporal stop location before (iii) drop-off location to the communication portion 22 of the management server 20. Further, the transmitted information of the temporal stop location is stored in a database in the management server 20. The management server 20 is configured to periodically transmit to the communication device 46 via the communication portion 22 aggregated data of the temporal stop location transmitted from each of the vehicles 40. The aggregated data may include information on locations at which vehicles other than the vehicles 40 temporarily stopped. In other words, historical data of the temporal stop location which was aggregated by the management server 20 is accumulated.

The autonomous travel control portion 51 and the visualization processing portion 52 of the transportation vehicle are configured to set the threshold value for the distance determination before (iii) drop-off location based on the transportation information described above and the historical data of the temporal stop location in the database 42. For example, the autonomous travel control portion 51 and the visualization processing portion 52 specify a stoppable location, based on the historical data of the temporal stop location, which is close to (iii) drop-off location before (iii) drop-off location and also is highest usage frequency (hereinafter referred to as a "most frequent stop location"). Then, the autonomous travel control portion 51 and visualization processing portion 52 calculate as the threshold value substituting for the predetermined distance a distance of the route from the most frequent stop location to (iii) drop-off location.

When using the predetermined distance in the distance determination which is executed before (iii) drop-off location, there is a possibility that the closest stoppable location is hard to specify around (iii) drop-off location. In addition, as described in the first embodiment, if the surrounding circumstances of (iii) drop-off location are bad view, there is a possibility that (iii) drop-off location is hard to recognize from the temporal stop location. In this regard, when using the historical data of the temporal stop location, it is possible to perform the pause task and reliably recognize the surrounding circumstances of (iii) drop-off location. In order to improve the attribution of the most frequent stop location, it is desirable that the historical data of the temporal stop location is aggregated by associating with (iii) drop-off location which was included in the past transportation request and time zone during which the pause task was carried out.

In the third embodiment, processing to change the threshold value may be carried out by the transportation management portion 21. In this case, the changed threshold value is added to the transportation information transmitted from the management center 10 to the transportation vehicle. When the processing to change the threshold value is carried out by the transportation management portion 21, there is no need to accumulate in the database 42 the aggregated data of the temporary stop location which is stored in the databased of the management server 20. Therefore, it is possible to suppress data capacity of the database 42. Also, there is no need to search the closest stoppable location by the autonomous travel control portion 51. Therefore, it is possible to reduce processing burden of the autonomous travel control portion 51.

2. Example of a Flow of the Transportation Service

Figure 5:
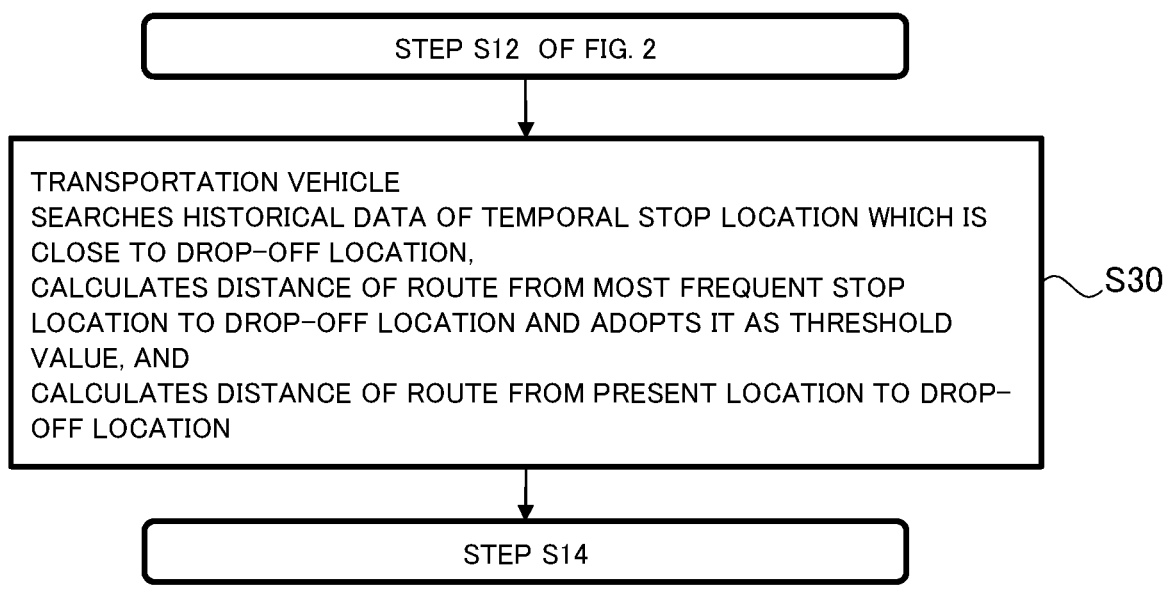
FIG. 5 is a flowchart for showing an example of a flow of the transportation service with the automatic drive vehicle according to a third embodiment of the present disclosure.
Figure 6:
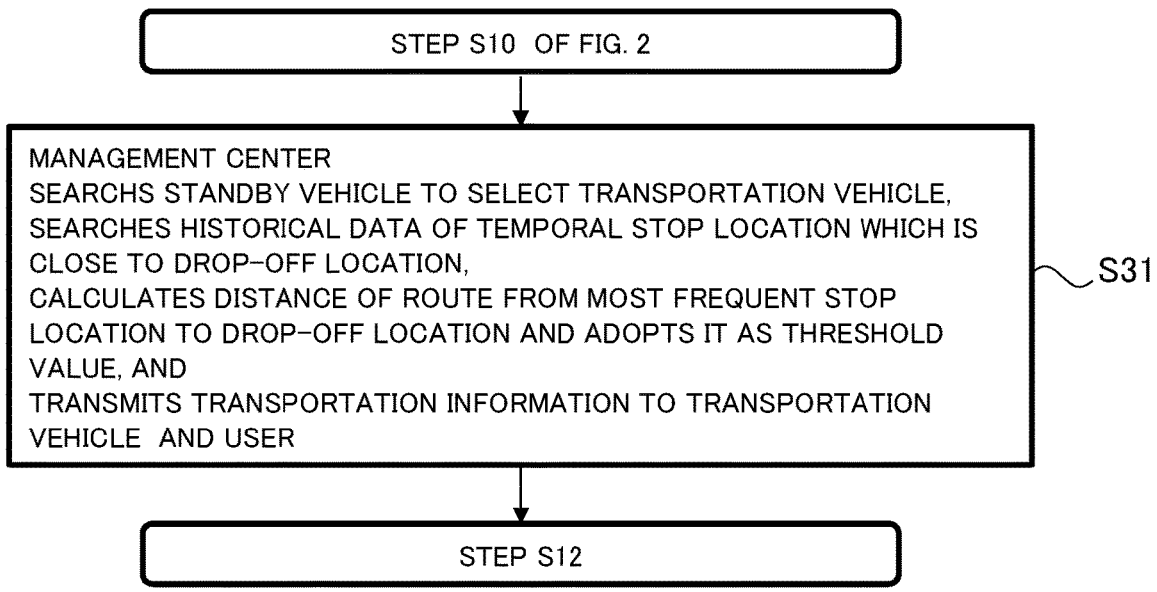
FIG. 6 is a flowchart for showing another example of a flow of the transportation service with the automatic drive vehicle according to the third embodiment.

An example of a processing flow of the transportation service according to the third embodiment will be described with reference to FIGS. 5 and 6. FIG. 5 is a flowchart for showing an example of a flow of the transportation service with the automatic drive vehicle according to the third embodiment. FIG. 6 is a flowchart for showing another example of a flow of the transportation service with the automatic drive vehicle according to the third embodiment.

The processing flow of the transportation system shown in FIG. 5 is a flow after the user operates the mobile terminal 30 to start up the application 31. In FIG. 5, processing which is executed in substitution for the step S13 shown FIG. 2 will be described. The processing before the step S12 (i.e. the processing steps from S10 to S12) and the processing after the step S14 (that is, the processing from steps S14 to S17) is the same as described in FIG. 2.

The processing of step S30 shown in FIG. 5 is started after the start of autonomous travel towards (iii) drop-off location. In the step S30, the transportation vehicle searches the historical data of the past temporal stop location which is close to (iii) drop-off location. In addition, the transportation vehicle calculates the distance of the route from the most frequent stop location to (iii) drop-off location and adopts it as the threshold value which is used in the distance determination of the step S14. Then, the transportation vehicle calculates the distance of the route from the present location to (iii) drop-off location.

The processing flow of the transportation system shown in FIG. 6 is basically the same as the processing flow shown in FIG. 5. In FIG. 6, processing which is executed in substitution for the step S11 shown FIG. 2 will be described. The processing of the step S10 and the processing after the step S12 (that is, the processing from steps S12 to S17) is the same as described in FIG. 2.

The processing of step S31 shown in FIG. 6 is started when the management center 10 receives the transportation request. In the step S31, the management center 10 searches the standby vehicle from the vehicles 40 to select the transportation vehicle. In addition, the management center 10 searches (iii) historical data of the past temporal stop location which is close to (iii) drop-off location. Then, the management center 10 calculates the distance of the route from the most frequent stop location to (iii) drop-off location and adopts it as the threshold value to be used in the distance determination of the step S14. Then, the management center 10 transmits the transportation information to the selected transportation vehicle and the user. The transportation information transmitted to the selected transportation vehicle includes, for example, (i) user ID information, (ii) pickup location, and a newly adopted threshold value.

3. Effects According to the Automatic Drive Vehicle According to the Third Embodiment According to the third embodiment described above, the new threshold value is adopted based on the historical data of the past temporal stop location which is close to (iii) drop-off location. Or, in the third embodiment, the new threshold value is adopted which was updated by the management center 10 based on the historical data of the past temporal stop location which is close to (iii) drop-off location. Therefore, it is possible to perform the pause task at the most frequent stop location and reliably recognize the surrounding circumstances of (iii) drop-off location.

Fourth Embodiment

1. Characteristic of the Automatic Drive Vehicle According to a Fourth Embodiment In the first embodiment described above, the surrounding circumstances of (iii) drop-off location shown in FIG. 3 is displayed on the touch-screen 45. In the fourth embodiment, availability information of the drop-off task is superimposed to display on the surrounding circumstances of (iii) drop-off location.

In the fourth embodiment, the visualization processing portion 52 is configured to, in the generation processing described above, superimpose actual availability information of the drop-off task on the 2D or 3D image which is displayed on the touch-screen 45. The availability information of the drop-off task is generated based on the landmark information recognized in the recognition processing described above. For example, from the landmark information, when a parked is recognized at a location close to (iii) drop-off location, the visualization processing portion 52 determines that the drop-off task is impossible at this location. On the other hand, when there is no landmark information recognized at the location close to (iii) drop-off location, the visualization processing portion 52 determines that the drop-off task is possible at this location. Then, based on the determination result, the visualization processing portion 52 generates the availability information of the drop-off task on the 2D or 3D image.

2. Example of a Flow of the Transportation Service

Figure 7:
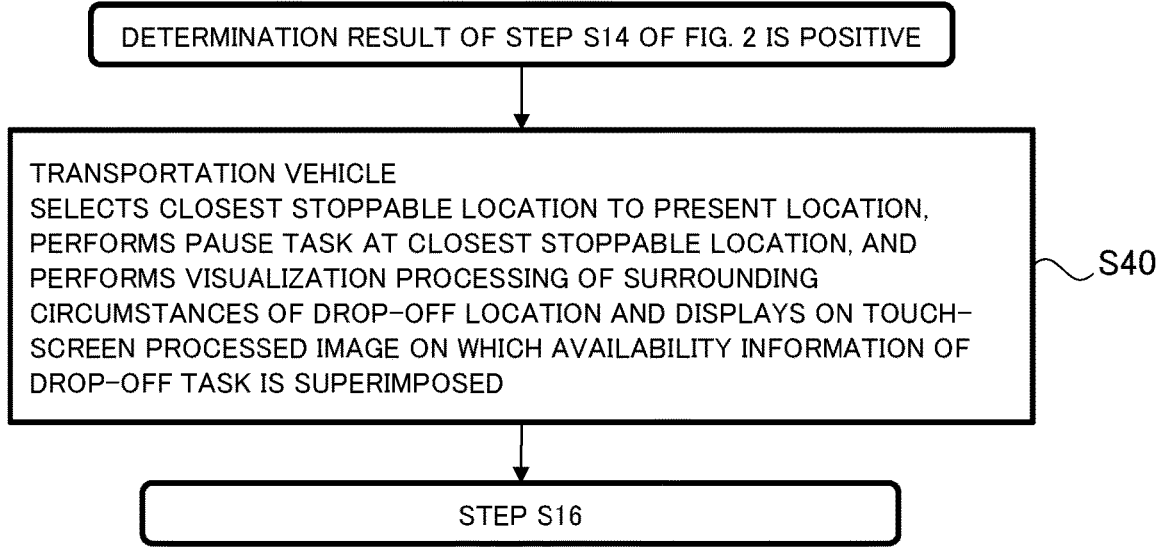
FIG. 7 is a flowchart for showing an example of a flow of the transportation service with the automatic drive vehicle according to a fourth embodiment of the present disclosure.
Figure 8:
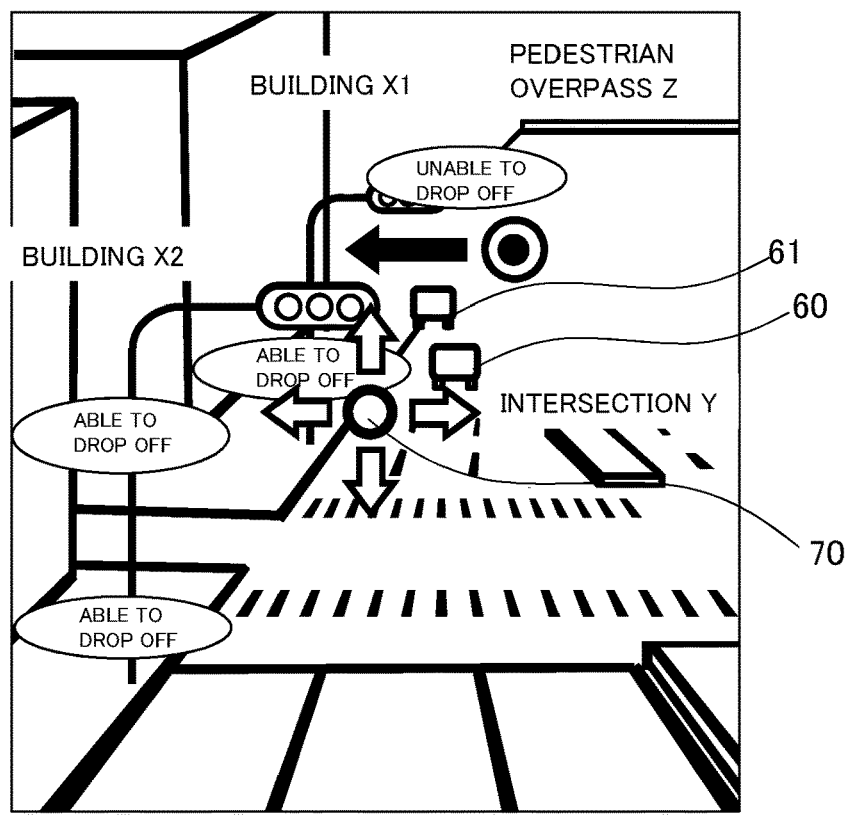
FIG. 8 is a diagram for showing an example of a 3D image around (iii) drop-off location that is included in a transportation request.

An example of a processing flow of the transportation service according to the fourth embodiment will be described with reference to FIGS. 7 and 8. FIG. 7 is a flowchart for showing an example of a flow of the transportation service with the automatic drive vehicle according to the fourth embodiment. FIG. 8 is a diagram for showing an example of a 3D image around (iii) drop-off location.

The processing flow of the transportation system shown in FIG. 7 is basically the same as the processing flow shown in FIG. 2. In FIG. 7, processing which is executed in substitution for the step S15 shown FIG. 2 will be described. The processing before the step S14 (i.e. processing from the steps S10 to S14) and the processing after the step S16 (that is, the processing of steps S16 and S17) is the same as described in FIG. 2.

As shown in FIG. 7, when the determination result of step S14 is positive, the transportation vehicle performs processing of step S40. In the step S40, the transportation vehicle selects the closest stoppable location to the present location. The transportation vehicle also performs the pause task at this closest stoppable location. Then, the transportation vehicle performs visualization processing of the surrounding circumstances of (iii) drop-off location obtained from the recognition device 41, and displays on the touch-screen 45 the processed image on which the availability information of the drop-off task is superimposed.

FIG. 8 shows an example of a surrounding image of (iii) drop-off location displayed on the touch-screen 45. In FIG. 8, information on "able to drop off" and "unable to drop off" is superimposed on the processed image described with reference to FIG. 3. Specifically, the information on "able to drop off" is displayed at a location before the intersection Y, after turning the intersection Y to left and after crossing the intersection Y. The information on "unable to drop off" is displayed at a location ahead of the building X1. When the user taps one of the arrows of the pointer 70 to move the pointer 70, and then taps the circle of the pointer 70 after the circle reaches any one of the information on "able to drop off". In such a way, the user is able to specify the detailed drop-off location.

3. Effects According to the Automatic Drive Vehicle According to the Fourth Embodiment According to the fourth embodiment described above, the availability information of the drop-off task is superimposed to display on the surrounding circumstances of (iii) drop-off location. Therefore, it is possible for the user to specify the detailed location where he/she truly desires to get off the transportation vehicle while looking at the processed image considering actual situation and the availability information.

Fifth Embodiment

1. Characteristic of the Automatic Drive Vehicle According to a Fifth Embodiment In the first embodiment described above, the surrounding circumstances of (iii) drop-off location is displayed on the touch-screen 45. In the fifth embodiment, the surrounding circumstances of (iii) drop-off location is displayed on a screen of the mobile terminal 30.

In the fifth embodiment, the communication device 46 (i.e. the communication portion) is configured to transmit data of the processed image generated by the visualization processing portion 52 to the mobile terminal 30 by the Near Field Communication function. The mobile terminal 30 is configured to display the received processed image on the screen. In addition, in the fifth embodiment, the mobile terminal 30 has a function to display the received processed image on the screen as one of the functions during the application 31 is activated. Another function during the activation of the application 31 is to display a map of surrounding area of the present location of the transportation vehicle. When the mobile terminal 30 receives the data of the processed image by the Near Field Communication, the processed image is displayed on the screen together with the map of the surrounding area. Instead of displaying the map of the surrounding area, only the processed image may be displayed on the screen.

2. Example of a Flow of the Transportation Service

Figure 9:
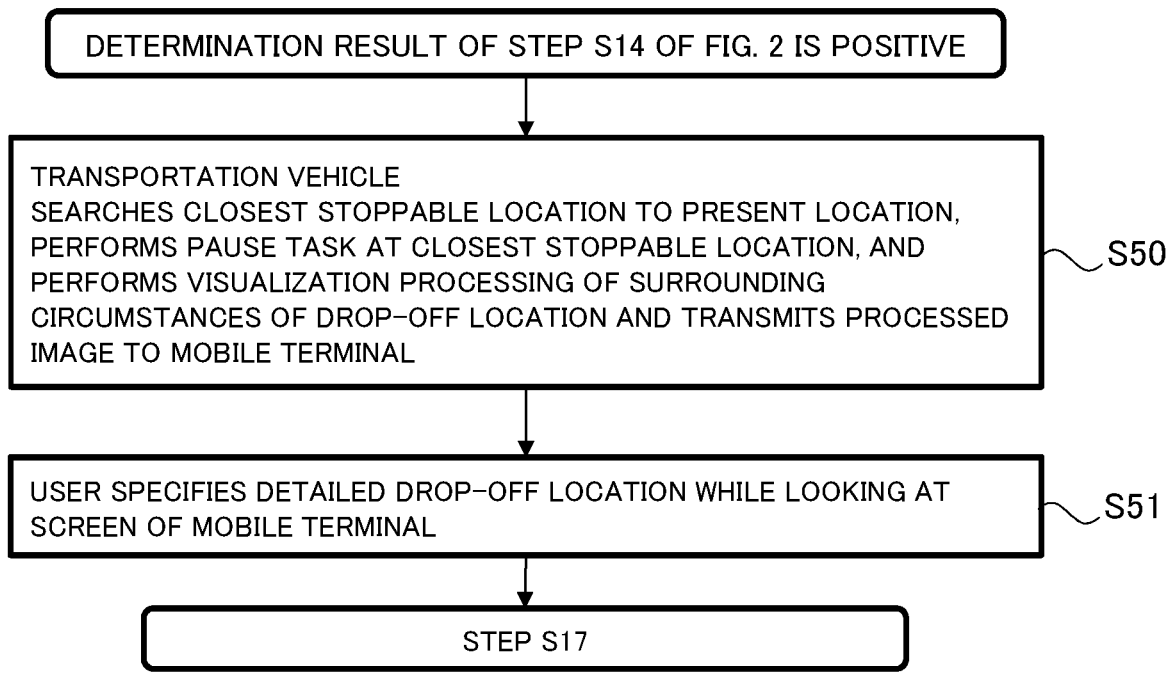
FIG. 9 is a flowchart for showing an example of a flow of the transportation service with the automatic drive vehicle according to a fifth embodiment of the present disclosure.

An example of a processing flow of the transportation service according to the fifth embodiment will be described with reference to FIG. 9. FIG. 9 is a flowchart for showing an example of a flow of the transportation service with the automatic drive vehicle according to the fifth embodiment. In FIG. 9, processing which is executed in substitution for the steps S15 and S16 shown FIG. 2 will be described. The processing before the step S14 (i.e. the processing steps from S10 to S14) and the processing of the step S17 is the same as described in FIG. 2.

As shown in FIG. 9, when the determination result of step S14 is positive, the transportation vehicle performs processing shown in step S50. In the step S50, the transportation vehicle searches closest stoppable location to the present location. The transportation vehicle also performs the pause task at this closest stoppable location. Then, the transportation vehicle performs visualization processing of the surrounding circumstances of (iii) drop-off location obtained from the recognition device 41, and transmits the processed image to the mobile terminal 30. The visualization processing of the surrounding circumstances of (iii) drop-off location may be carried out in parallel with the search processing of the closest stoppable location, and the processed image may be transmitted to the mobile terminal 30 during or soon after the operation of the pause task.

When the surrounding image of (iii) drop-off location is transmitted to the mobile terminal 30, it is possible for the user to specify the detailed drop-off location. In step S51, the user specifies the detailed drop-off location while looking at the screen of the mobile terminal 30. Note that the example of the processed image on the screen is the same as the example described with reference to FIG. 3.

3. Effects According to the Automatic Drive Vehicle According to the Fifth Embodiment According to the fifth embodiment described above, the automatic drive vehicle performs the pause task before (iii) drop-off location and transmits the processed image of (iii) drop-off location to the mobile terminal 30. Therefore, by using the screen of the mobile terminal 30, it is possible to obtain similar effects as the automatic drive vehicle according to the first embodiment.

Other Embodiments

The transportation system according to each of the embodiments described above may be modified as follows.

The characteristics of the second to the fourth embodiments in premise of the automatic drive vehicle according to the first embodiment. However, these characteristics may be combined with the characteristic of the fifth embodiment. That is, by combining the second and fifth embodiments, the surrounding image of (iii) drop-off location may be displayed on the screen of the mobile terminal 30 during the deceleration processing. Also, by combining the third and fifth embodiments, the distance determination before (iii) drop-off location may be carried out by using the threshold value which is set based on the historical data of the temporal stop location in the database 42. Also, by combining the fourth and fifth embodiments, the availability information of the drop-off task may be superimposed on the surrounding image of (iii) drop-off location.

Further, face authentication by a camera sensor may be used as a method for user authentication. Specifically, a face picture of the user photographed with the camera sensor of the mobile terminal 30 is transmitted to the management center 10 at an admission to the transportation service and the face picture is registered in the database of the management server 20. Then, when the user uses the transportation service, the facial photograph data is added to the transportation information which is transmitted to the vehicle (the transportation vehicle) by the management center 10. The user authentication portion 53 collates a photograph of a person in the vicinity of the vehicle 40 photographed by the camera sensor of the vehicle 40 with the facial photograph data from the management server 20. And if the photograph matches the facial photograph data, the user authentication portion 53 recognizes the person as the user who has transmitted the transportation request.

As another method of user authentication, authentication using proximity wireless communication such as FeliCa (registered trademark) or NFC may be used. In this case, the mobile terminal 30 has a proximity wireless communication function or a dedicated IC card, and the vehicle 40 (the transportation vehicle) has a communication device for proximity wireless communication outside the vehicle 40. The user authentication portion 53 collates ID information of the mobile terminal 30 obtained from the management server 20 with ID information directly obtained from the mobile terminal 30 or the from the IC card by the proximity wireless communication. If ID information from the management server 20 matches the ID information from the mobile terminal 30 or the IC card, the user authentication portion 53 recognizes the person who has the mobile terminal 30 or the IC card as the user who has transmitted the transportation request.

What is claimed is:

1. An automatic drive vehicle which is configured to travel autonomously from a pickup location to a drop-off location in accordance with a transportation request from a user, comprising:
    one or more sensors for providing information on an area surrounding the automatic drive vehicle, wherein the one or more sensors include a camera mounted on the automatic drive vehicle;
    a user interface; and
    a controller configured to:
    control the automatic drive vehicle to travel autonomously along a route from the pickup location to the drop-off location;
    recognize an environment surrounding the automatic drive vehicle while controlling the automatic drive vehicle to travel autonomously; and
    before reaching the drop-off location, determine whether a present location of the automatic vehicle is equal to or less than a predetermined distance from the drop-off location;
    based upon the present location of the automatic vehicle being equal to or less than the predetermined distance from the drop-off location, execute processing to visualize the surrounding environment and generate a processed image of the surrounding environment based on the information provided by the camera;
    display the processed image to the user using the user interface, wherein the processed image is a camera image of the drop-off location;
    perform a pause task, wherein the pause task is a task to automatically stop the automatic drive vehicle temporarily at a stoppable location closest to the present location during the display of the processed image by the user interface to the user before the user is dropped off; and
    after the processed image is displayed by the user interface, and in response to the user specifying a detailed drop-off location in the processed image using the user interface, control the automatic drive vehicle as to travel autonomously along a route from the stoppable location to the detailed drop-off location that was specified by the user.

2. The automatic drive vehicle according to claim 1,
    wherein the controller is further configured to perform a deceleration processing,
    wherein the deceleration processing is processing for setting a target speed of the automatic drive vehicle to be equal to or less than a predetermined speed during the providing of the processed image by the user interface portion.

3. The automatic drive vehicle according to claim 1, further comprising
    a database storing historical data of the stoppable location at which the pause task was carried out,
    wherein the controller is further configured to:
    specify, based on the historical data, a stoppable location which is determined based on proximity to the drop-off location and highest usage frequency as a most frequent stop location; and
    perform the pause task when a distance of the route from the present location to the drop-off location is equal to or less than a distance from the most frequent stop location to the drop-off location.

4. The automatic drive vehicle according to claim 1,
    wherein the controller is further configured to execute superposition processing,
    wherein the superposition processing is processing to superimpose availability information of a drop-off task on the processed image.

5. An automatic drive vehicle which is configured to travel autonomously along a route from a pickup location to a drop-off location in accordance with a transportation request from a mobile terminal of a user, comprising:
    one or more sensors for providing information on an area surrounding the automatic drive vehicle, wherein the one or more sensors include a camera mounted on the automatic drive vehicle;
    a communication interface configured to perform near-field communication with the mobile terminal;
    a controller configured to:
    control the automatic drive vehicle to travel autonomously along a route from the pickup location to the drop-off location;
    recognize an environment surrounding the automatic drive vehicle while controlling the automatic drive vehicle to travel autonomously; and
    before reaching the drop-off location, determine whether a present location of the automatic vehicle is equal to or less than a predetermined distance from the drop-off location;
    based upon the present location of the automatic vehicle being equal to or less than the predetermined distance from the drop-off location, execute processing to visualize the surrounding environment and generate a processed image of the surrounding environment based on the information provided by the camera;
    display the processed image to the user on the mobile terminal, wherein the processed image is a camera image of the drop-off location;
    perform a pause task, wherein the pause task is a task to automatically stop the automatic drive vehicle temporarily at a stoppable location closest to the present location during the display of the processed image to the mobile terminal of the user before the user is dropped off; and after the processed image is displayed by the mobile terminal via the communication interface, and in response to the user specifying a detailed drop-off location in the processed image using the mobile terminal of the user via the communication interface, control the automatic drive vehicle to travel autonomously along a route from the stoppable location to the detailed drop-off location that was specified by the user.

6. The automatic drive vehicle according to claim 5,
wherein the controller is further configured to perform a deceleration processing,
wherein the deceleration processing is processing for setting a target speed of the automatic drive vehicle to be equal to or less than a predetermined speed during the providing of the processed image to the mobile terminal.

7. The automatic drive vehicle according to claim 5, further comprising
a database storing historical data of the stoppable location at which the pause task was carried out,
wherein the controller is further configured to:
specify, based on the historical data, a stoppable location which is determined based on proximity to the drop-off location and highest usage frequency as a most frequent stop location; and
perform the pause task when a distance of the route from the present location to the drop-off location is equal to or less than a distance from the most frequent stop location to the drop-off location.

8. The automatic drive vehicle according to claim 5,
wherein the controller is further configured to execute superposition processing,
wherein the superposition processing is processing to superimpose availability information of a drop-off task on the processed image.

9. The automatic drive vehicle according to claim 1,
wherein the one or more sensors provide real-time information on the area surrounding the automatic drive vehicle, and
wherein the processed image is based on the real-time information provided by the one or more sensors.

10. The automatic drive vehicle according to claim 5,
wherein the one or more sensors provide real-time information on the area surrounding the automatic drive vehicle, and
wherein the processed image is based on the real-time information provided by the one or more sensors.

* * * * *

UNITED STATES PATENT AND TRADEMARK OFFICE
CERTIFICATE OF CORRECTION

| | |
|---|---|
| PATENT NO. | : 11,822,338 B2 |
| APPLICATION NO. | : 16/112903 |
| DATED | : November 21, 2023 |
| INVENTOR(S) | : Makoto Morita and Koji Taguchi |

It is certified that error appears in the above-identified patent and that said Letters Patent is hereby corrected as shown below:

On the Title Page

Please add:
(30) Foreign Application Priority Data
Oct. 27, 2017 (JP).........................2017-208044

Signed and Sealed this
Second Day of January, 2024

Katherine Kelly Vidal
*Director of the United States Patent and Trademark Office*